Figure 1:
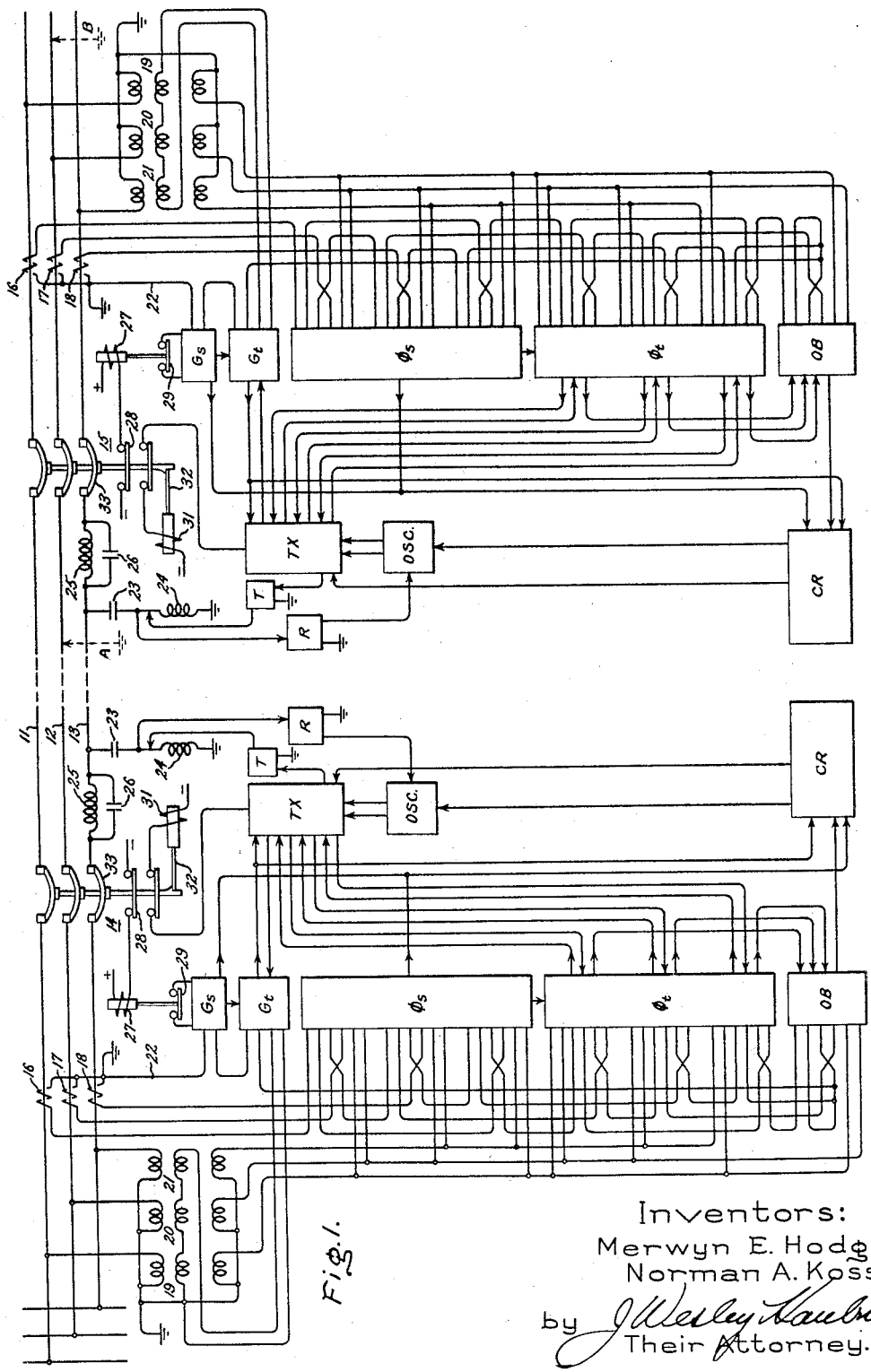

Inventors:
Merwyn E. Hodges,
Norman A. Koss,
by J. Wesley Lauber
Their Attorney.

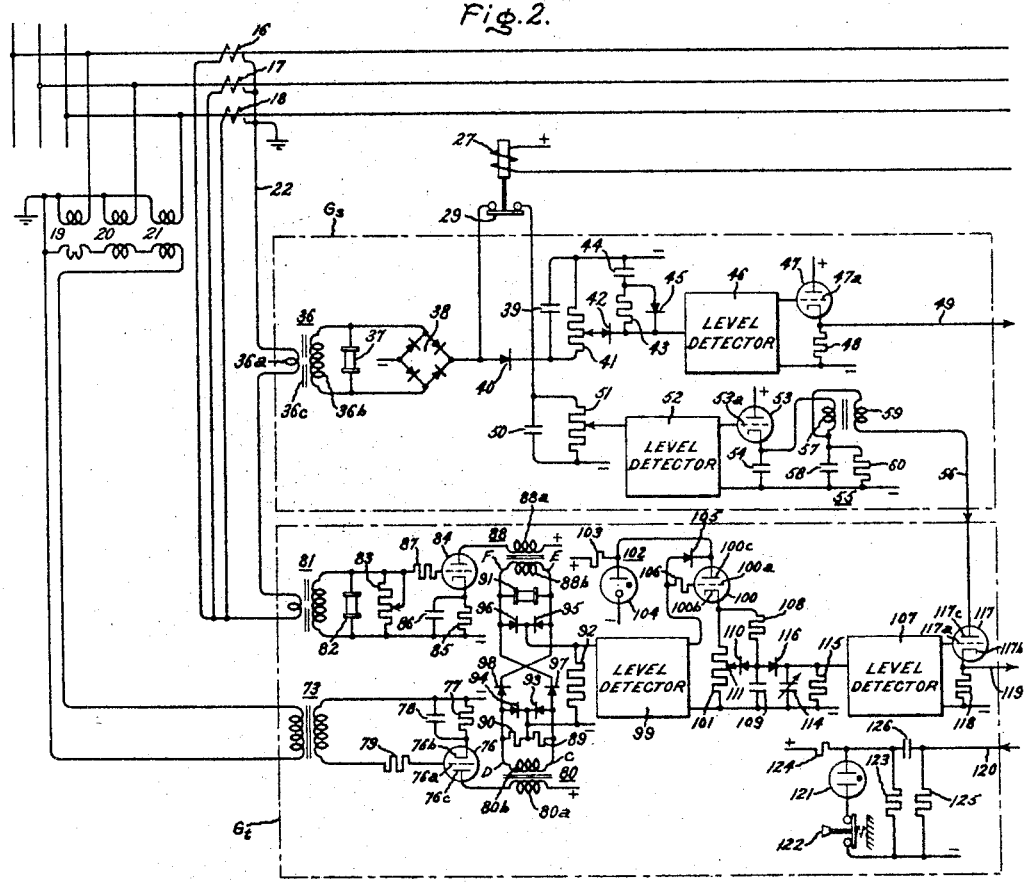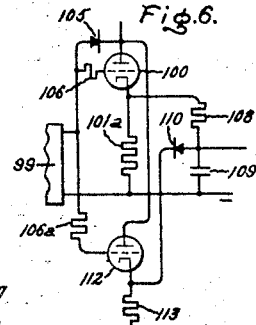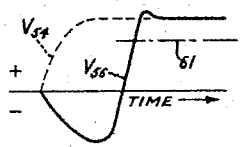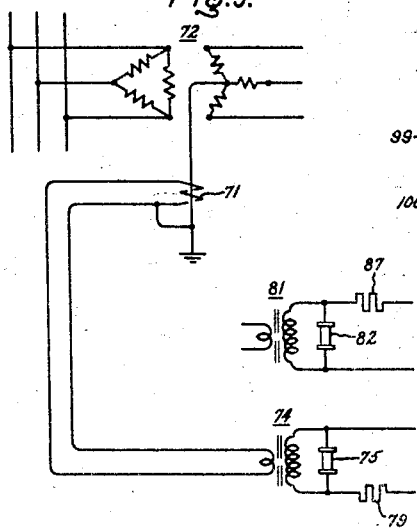

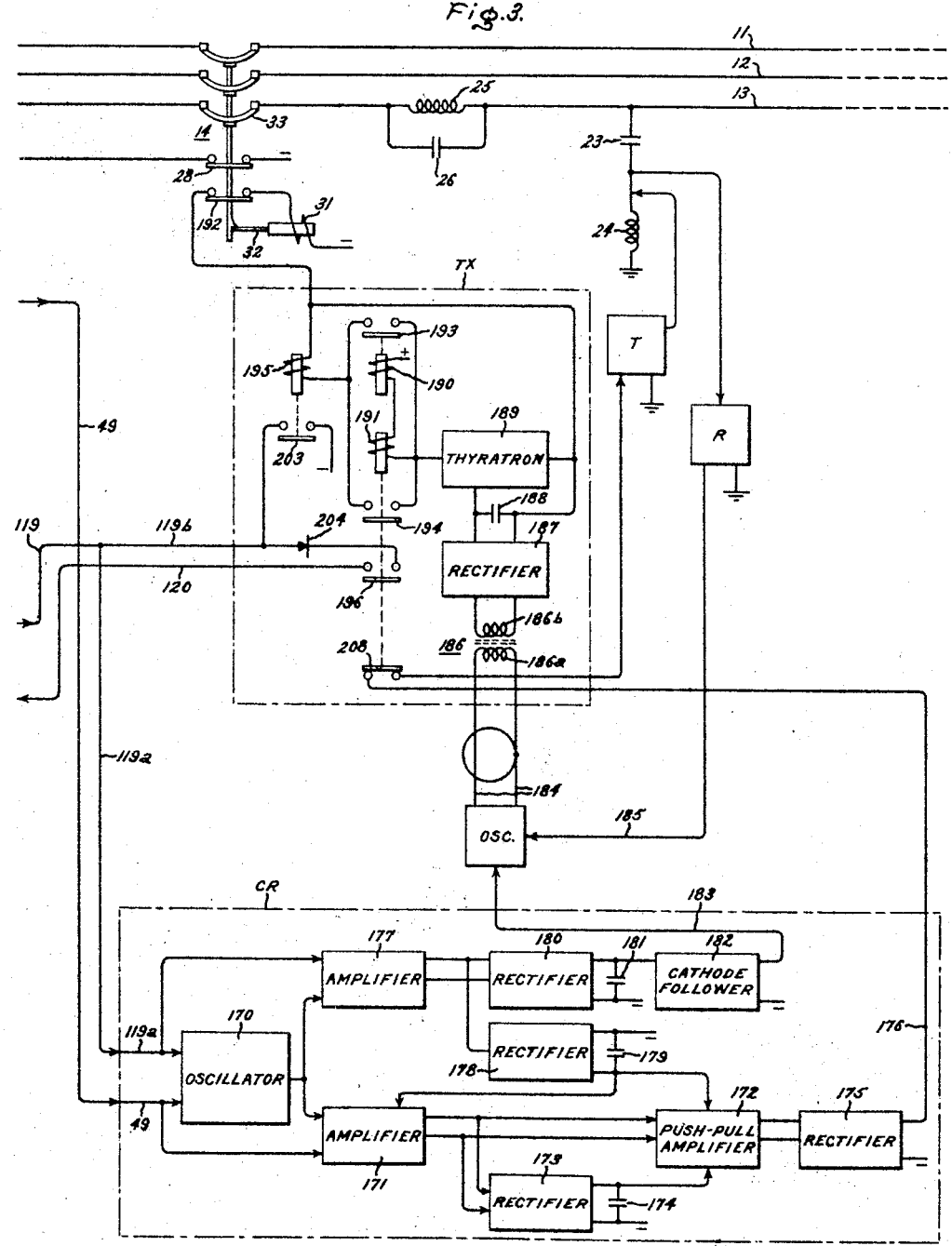

United States Patent Office 2,879,453
Patented Mar. 24, 1959

2,879,453

FAULT RESPONSIVE PROTECTIVE SYSTEM FOR AN ELECTRIC POWER TRANSMISSION LINE

Merwyn E. Hodges and Norman A. Koss, Philadelphia, Pa., assignors to General Electric Company, a corporation of New York Application November 19, 1954, Serial No. 469,947

24 Claims. (Cl. 317—28)

This invention relates to fault responsive protective systems for electric power transmission lines, and more particularly to a directional-comparison pilot type transmission line protective system employing extremely high speed electronic relays.

The trend today in the field of electric power, principally perhaps for reasons of economy, is to operate high-voltage transmission lines at loads which approach system stability limits. In order to maintain stability and to preserve continuity of service to the electric power consumers, it is increasingly desirable in present day electric power transmission applications to provide protective relaying systems capable of extremely high speed response. A protective relaying arrangement which will respond to any fault condition on a transmission line within one cycle (based on the typical power system frequency of 60 cycles per second) would contribute greatly to the mitigation of damage caused by a fault and to the prevention of major system interruptions. Accordingly, it is a general object of this invention to provide for a high-voltage electric power transmission line, a fault responsive protective relaying system which will perform a preselected control function in less than one cycle after the occurrence of a fault conduction.

A high-voltage transmission line typically conducts three-phase alternating current between two multipole high-speed circuit breakers located at opposite ends or terminals of the transmission line. In some instances the line may be tapped and employ circuit breakers at all terminals. In order to minimize the disturbance to the sound sections of the electric power system while removing a transmission line from service upon the occurrence of a fault condition, it is highly desirable to open all circuit breakers substantially simultaneously. This is especially true where the circuit breakers are called upon to reclose instantaneously. Therefore, another object of this invention is to provide for a high-voltage electric power transmission line, a fault responsive protective relaying system capable of supplying tripping impulses substantially simultaneously to the circuit breakers at all terminals of the line within one cycle following the occurrence of a fault at any point on the protected transmission line.

In a high speed selective protective relaying system for a transmission line it is necessary to provide a pilot channel for instantly conveying certain information from one terminal to all others. One well-known method of obtaining this necessary intercommunication is by carrier-current, wherein one of the conductors of the transmission line is used to carry a high frequency continuous signal from one terminal to the others. The signal is utilized to prevent or block tripping of the circuit breakers located at the terminals. By providing suitable components, the protective relaying system will operate as follows: if a fault occurs at a point remote from or external to the protected transmission line, carrier-current is transmitted from at least one of the terminals to block tripping of the circuit breakers at all other terminals. If a fault occurs on the protected transmission line, carrier-current transmission is immediately stopped at all terminals and all circuit breakers are tripped thereby isolating the faulted transmission line. It is therefore another object of this invention to provide a transmission line protective relaying system adaptable for use with conventional pilot channels and capable of selective response within one cycle following the occurrence of a fault condition.

The speed of operation of a conventional electromechanical relay is affected by the magnitude of the electric quantity to which it responds. Furthermore, the speed of operation of a conventional electromechanical relay is inherently limited by the inertia of its moving parts. Another object of this invention is to provide for a high-voltage transmission line protective relaying system, relays utilizing electronic elements to obtain a consistent overall operating speed of less than one cycle in response to a fault located at any point on the transmission line and regardless of the magnitude of fault current.

A further object of this invention is to provide a reliable transmission line protective relaying system utilizing electronic relay components.

It is another object of this invention to provide for a high-voltage electric power transmission line an extremely high-speed fault responsive protective electronic relaying system which is exceptionally sensitive and accurate regardless of supply voltage fluctuations or ambient temperature variations.

Another object of this invention is to provide an improved overcurrent relay utilizing electronic elements to produce an output control signal within an extremely short time interval when energized by alternating current of a predetermined magnitude and to maintain this output control signal for at least a predetermined length of time.

Another object of this invention is to provide an improved directional relay utilizing electronic elements to produce an output control signal within an extremely short time following energization by two alternating electric quantities having a predetermined phase relationship with respect to each other.

Still another object of this invention is to provide an electronic relaying system including directional responsive and overcurrent responsive elements coordinated in a manner to produce an output control signal only when both elements are operably energized but not until at least a predetermined time interval has elapsed following operable energization of the overcurrent responsive element.

It is another object of this invention to provide an improved relay and control system of the character described.

In carrying out our invention in one form, we provide a ground fault responsive protective relaying system of the directional-comparison type for a high-voltage transmission line, which line is equipped with suitable carrier-current transmitting and receiving means at each terminal. The relaying system operates to initiate tripping of a circuit breaker located at each terminal of the protected transmission line within one cycle on a 60 cycles per second basis in response to the occurrence of a short circuit from the protected transmission line to ground (a ground fault). The relaying system comprises at each terminal an overcurrent responsive electronic relay, a directional responsive electronic relay, and suitable electronic control and auxiliary relays. The overcurrent responsive relay is supplied by the residual alternating current in the neutral circuit of current transformers coupled to the transmission line. Any ground fault in the electric power system within the protected transmission line and beyond it by a suitable margin will cause the residual current to exceed a first predetermined magnitude. The overcurrent relay responds to this magnitude of residual current to produce rapidly, and to maintain for at least a certain period of time, a first control signal. The overcurrent relay also develops a coordinating signal which is supplied to the directional responsive relay after a definite time interval in response to another predetermined magnitude of residual current. The first control signal acts through an electronic control relay to energize a carrier-current transmitting means which instantly generates continuous signal current. The receiving means located at each of the other terminals of the transmission line is energized by this signal current to disable an associated electronic auxiliary relay which is employed to initiate tripping of the associated circuit breaker. Thus, the immediate effect of the ground fault is to prevent or block tripping of the circuit breakers.

The directional responsive relay is supplied by the residual alternating current and also by a polarizing alternating quantity derived from the transmission line. The phase relationship between residual current and polarizing quantity indicates the direction of a ground fault with respect to the local terminal. Whenever this phase relationship falls within predetermined limits which indicate that a ground fault is located in the direction of the protected transmission line, the directional relay rapidly responds to produce a second control signal, but this control signal cannot be produced until a coordinating signal is received from the overcurrent responsive relay. The second control signal acts through the control relay to deenergize the local carrier-current transmitting means, thus discontinuing the signal current, and to energize the auxiliary relay in an attempt to trip the local circuit breaker. Tripping of the local circuit breaker is permitted only after the auxiliary relay is unblocked by deenergization of the local carrier-current receiving means as a result of the discontinuance of signal current at all of the remote terminals. In this manner, the circuit breaker at each terminal is tripped to remove the protected transmission line from service whenever a ground fault occurs on the protected transmission line. The second control signal is also utilized to energize an operation indicator or target whenever the auxiliary relay operates to initiate tripping of the local circuit breaker.

Our invention will be better understood and further objects and advantages will be apparent from the following description taken in conjunction with the accompanying drawings, in which Fig. 1 is a schematic diagram, partly in block form, of a high-voltage transmission line having a fault responsive protective relaying system of the directional-comparison carrier-current pilot type which embodies a preferred form of our invention; Figs. 2 and 3 (Sheet 2 and 3) taken together are a more detailed schematic circuit diagram of the ground fault relaying apparatus shown in block form at one terminal of the transmission line of Fig. 1, Fig. 2 illustrating the detailed circuitry of the overcurrent responsive and directional responsive relays forming part of our invention and Fig. 3 showing the various devices functionally associated with the relays of Fig. 2; Fig. 4 is a graphical representation of the wave forms of voltages in the time delay element of the overcurrent responsive relay; Fig. 5 is a fragmentary schematic circuit diagram of an alternative arrangement for obtaining a polarizing quantity for the directional responsive relay; and Fig. 6 is a fragmentary schematic circuit diagram of an alternative arrangement for the time interval detecting circuit of the directional responsive relay.

To illustrate a preferred embodiment of our invention, we have shown in Fig. 1 a high-voltage transmission line protective relaying system of the directional-comparison carrier-current pilot relaying type. As can be seen in Fig. 1, a 3-phase transmission line, represented by conductors 11, 12 and 13, extends between two 3-pole circuit breakers 14 and 15. Circuit breakers 14 and 15 are located at what will be referred to hereinafter as the local and remote terminals, respectively, of the transmission line. The illustrated transmission line may be of the type employed in an electric power system to transmit 3-phase, alternating current of power frequency, such as 60 cycles per second, from one terminal to the other at very high voltage, e.g., 330,000 volts phase-to-phase. Identical protective relaying equipment is provided at each terminal to open quickly and simultaneously both circuit breakers 14 and 15, thereby isolating the transmission line, upon the occurrence of an internal fault, i.e., upon the occurrence of a short circuit between phase conductors (phase fault) or between a conductor and ground (ground fault) at some point along the line between the opposite terminals. The necessary intercommunication between the identical relaying equipments is accomplished in the illustrated embodiment of our invention by utilizing conductor 13 as a channel for transmission of high-frequency unmodulated carrier-current. Although we have illustrated only a two terminal transmission line, our invention is adaptable also to transmission lines having three or more terminals.

As shown in Fig. 1, at each terminal three instrument current transformers 16, 17, and 18 and three instrument potential transformers 19, 20, and 21 are coupled to conductors connecting each circuit breaker 14 and 15 to a 3-phase supply source or load bus of the power system. The secondary circuits of these instrument transformers are connected to certain relays at each terminal to supply current and voltage quantities which accurately reflect the current and voltage conditions existing at the transmission line. The relays which respond to these quantities may be divided into two general groups. A first group detects merely the existence of a fault condition, while a second group has directional characteristics and cooperates to determine the position of the fault. These relays, together with other relays which perform associated functions, will first be described very generally. Then we will describe in detail the elements of our invention.

In the first group of relays mentioned above, an impedance relay $\phi s$ located at each terminal, as shown in Fig. 1, responds immediately to a predetermined condition of line current and voltage which indicates that a phase fault has occurred. The fault thus detected may be located either internal to or external to the protected transmission line. Operation of the impedance relay $\phi s$ causes carrier-current to be transmitted over conductor 13, and carrier-current, as will be explained below, is employed to prevent opening of the circuit breakers. Impedance relay $\phi s$ will be referred to as a "phase starting" relay because it responds to a phase fault to start the transmission of carrier-current. Similarly, an overcurrent relay Gs is provided at each terminal to respond quickly whenever current in the residual circuit 22 of the current transformer connections reaches a magnitude which indicates that a ground fault has occurred. Relay Gs also operates to initiate the transmission of carrier-current and will be referred to as a "ground starting" relay. Thus, upon the occurrence of either a phase or a ground fault, carrier-current transmission is immediately started at each terminal.

A carrier-current transmitter T is used at each terminal to transmit the high frequency carrier-current. As can be seen in Fig. 1, a coupling capacitor 23 with sufficient insulation to withstand line voltage is connected in series circuit relationship with a drain coil 24 between conductor 13 and ground. Capacitor 23 easily passes high-frequency carrier-current, but presents a high impedance to the line current of power frequency. A parallel resonant circuit comprising an inductance 25 and a capacitor 26 tuned to the carrier-current frequency is connected in series circuit relation with conductor 13 to provide a wave trap which confines the carrier-current to the protected transmission line extending between opposite terminals, without introducing any appreciable impedance to the line current. Transmitter T is connected to capacitor 23, and, when energized by a control relay CR in response to operation of either the phase starting relay $\phi s$ or the ground starting relay $Gs$, the transmitter will generate a continuous signal current at a high frequency, such as 100,000 cycles per second. This signal current will follow two parallel paths to ground: through the local drain coil 24, and by way of coupling capacitor 23 and conductor 13 through the drain coil 24 located at the opposite terminal; and a substantial carrier-current signal voltage is developed across drain coil 24. A carrier-current receiver R is connected in parallel circuit relation with the drain coil 24 at each terminal and is tuned to the frequency of the carrier-current transmitted at the opposite terminal. Receiver R controls an auxiliary relay OSC in a manner to prevent or block tripping of the associated circuit breaker, 14 or 15, whenever the receiver is energized by the carrier-current signal voltage.

To determine the position of a fault, a mho type distance relay $\phi t$ and a ground current directional relay $Gt$ are provided at each terminal. These relays operate immediately in response to the occurrence of phase and ground faults, respectively, located in the direction of the protected transmission line as viewed from the respective terminal. Either relay $\phi t$ or relay $Gt$ when operated performs two functions: it immediately stops the transmission of carrier-current by the associated transmitter T, and it attempts to open or trip the associated circuit breaker. The mho type distance relay $\phi t$ is designated a "phase tripping" relay, and the ground current directional relay $Gt$ is designated a "ground tripping" relay.

The basic operation of the overall relaying system should now be understandable. As already stated, it is desired to open simultaneously both circuit breakers 14 and 15 upon the occurrence of an internal fault. As a corollary, it is desired to prevent tripping of either circuit breaker whenever a fault condition develops external to the protected transmission line. Assume first an internal ground fault at A in Fig. 1. The ground starting relay $Gs$ at both terminals will detect the fault and immediately start carrier-current. Because the ground fault current flows toward the protected transmission line at both terminals, both ground tripping relays $Gt$ will operate to stop carrier-current and attempt tripping. Consequently, carrier-current transmission is stopped at both terminals, tripping is no longer blocked, and both circuit breakers 14 and 15 will open. Assume now an external ground fault at B in Fig. 1. The ground starting relay $Gs$ at both terminals will detect the fault and immediately operate to start carrier-current. Ground fault current at the terminal of circuit breaker 14 flows toward the protected transmission line, and the associated ground tripping relay $Gt$ will operate to stop carrier-current transmission from this terminal and attempt to trip circuit breaker 14. However, at the terminal of circuit breaker 15, ground fault current flows away from the protected transmission line, and ground tripping relay $Gt$ at this terminal will not operate. As a result, carrier-current continues to be transmitted from this terminal and to be received at the other terminal, thereby blocking the attempt to trip circuit breaker 14. No attempt to trip circuit breaker 15 is made. The operation of the relay system will be the same as described above for phase faults with the exception that phase relays $\phi s$ and $\phi t$ are affected instead of ground relays $Gs$ and $Gt$.

To insure correct operation of the relaying system during external faults such as a ground fault at B in Fig. 1, it is essential that carrier-current is started at the terminal "seeing" an external fault (terminal 15), in order to block tripping, before the tripping relay operates at the terminal "seeing" an internal fault (terminal 14).

To provide for this sequence of operation, starting relay $Gs$ coordinates with the associated tripping relay $Gt$ in a manner whereby the tripping relay output control signal at terminal 14 is delayed until it is assured that the starting relay at terminal 15 has had an opportunity to complete its carrier-current starting function. This coordination, which is also provided between relays $Gs$ and $Gt$ at terminal 15, will be explained in detail below. Similar coordination is provided between relays $\phi s$ and $\phi t$.

During a circuit breaker closing operation, all poles of the breaker may not make contact at the identical instant of time. Whenever this uneven or sequential pole closure occurs, momentary unbalanced currents can flow which may appear to the ground relays $Gs$ and $Gt$ as an internal ground fault. Therefore, an electromagnetic relay 27 controlled by an auxiliary switch 28 of the circuit breaker is provided at each terminal as shown in Fig. 1. Relay 27 is energized and its contact 29 is closed only after all three poles of the circuit breaker are closed, and contact 29 must be closed, as will be explained hereinafter, before the necessary coordinating signal between relays $Gs$ and $Gt$ can be produced. In this manner false output from ground tripping relay $Gt$ is prevented during sequential pole closure.

Under certain conditions of power swings in the electric power system, which are power surges such as caused by the removal of a short circuit condition external to the protected line, or by the loss of synchronism between a generator and the system, the phase relays $\phi s$ and $\phi t$ may operate thereby giving a false indication of an internal fault. Therefore, an out-of-step blocking relay OB is provided to prevent or block the output control signal of the phase tripping relay $\phi t$ whenever a power swing is in progress. An out-of-step blocking relay particularly well suited for our purposes has been described and claimed in Patent 2,845,581, issued on July 29, 1958, to Merwyn E. Hodges and Harold T. Seeley.

As shown in Fig. 1, control relay CR, auxiliary relay OSC, and a tripping auxiliary unit TX are provided at each terminal to convert tripping relay signals into a signal suitable for energizing a trip coil 31 of the associated circuit breaker. Energization of trip coil 31 actuates a latch 32 thereby releasing switch member 33 of the circuit breaker for rapid circuit interrupting movement. Another function of the tripping auxiliary unit TX is to permit target operation in the tripping relay which operated to trip the circuit breaker. Unit TX also prevents energization of the associated transmitter T while the circuit breaker is opening.

To understand more fully the operation of our invention, reference should now be made to Figs. 2 and 3 and to the following description. Figs. 2 and 3 show, partly in block form, a schematic circuit diagram of the various components of the ground starting and tripping relays, $Gs$ and $Gt$ respectively, and of the associated relay units located at the terminal of circuit breaker 14. It will be understood from the foregoing that if desired the phase starting and tripping relays $\phi s$ and $\phi t$ which have been shown in block form in Fig. 1 may comprise suitable electromagnetic relays used heretofore to perform phase starting and tripping functions in other protective relaying systems. We prefer, however, to use for $\phi s$ and $\phi t$ the improved electronic relays which are fully described and claimed in a copending application S. N. 473,802 filed on December 8, 1954, by Harold T. Seely, Merwyn E. Hodges and Norman A. Koss and assigned to the present assignee.

Ground starting relay Gs

Ground starting relay $Gs$ operates to start carrier-current transmission immediately in response to the occurrence of a ground fault. A ground fault on the protected transmission line or nearby in the power system is indicated whenever current in residual circuit 22 of the Y-connected current transformers 16, 17, and 18 exceeds a predetermined minimum value. (Less than this minimum value of residual current merely indicates unbalanced currents in the 3-phase power system, such as caused by unbalanced loads.)

The residual circuit 22, as shown in Fig. 2, is connected to suitable transforming means 36 which, for the purposes of the illustrated embodiment of our invvention, preferably comprises primary and secondary windings, 36a and 36b respectively, and an iron core 36c which has an air gap. Transforming means 36 operates to derive a voltage representative of the residual current both in magnitude and phase over the operating range of current values while imposing minimum burden on the current transformers. The magnitude of voltage across secondary winding 36b and the phase angle by which it leads the current in primary winding 36a is determined by the amount of load in the secondary circuit. Open circuit secondary voltage leads the primary current by 90 electrical degrees. Due to the high percentage of total primary current used for magnetizing the iron, initial transient D.-C. offset in the fault current wave form will not be appreciably reproduced in the secondary voltage. The transforming means 36 also serves as a desirable means for insulating succeeding relay circuits from the current transformer connections.

Because the succeeding relaying circuits are designed to operate over a wide range of fault currents, it is possible that during a condition of maximum fault current an extremely large voltage may be induced in the secondary winding 36b. To prevent injury to the insulation of the secondary winding and to protect the succeeding relaying components which might otherwise be damaged by such a large voltage, a voltage limiter 37 is connected across the secondary winding 36b. The voltage limiter 37 has a non-linear current-voltage characteristic, that is, the ohmic value of the limiter decreases with increasing voltage applied across it so that current will increase at a greater rate than voltage. Many such non-linear current-voltage characteristic devices are known in the art, and for the purposes of the illustrated embodiment of our invention we prefer at present to use a special ceramic resistance material comprising silicon carbide crystals held together by a suitable binder, such as described and claimed in U.S. Patent 1,822,742, issued to Karl B. McEachron on September 8, 1931. Limiter 37 provides means for increasing the secondary load as the secondary voltage increases thereby limiting the maximum possible peak value of secondary voltage to a safe value without interfering with measurement accuracy at the normally smaller values of voltage.

The voltage across secondary winding 36b, which is an accurate measurement of the residual current at operating magnitudes, is supplied to suitable rectifying means, such as the full wave bridge type rectifier 38 illustrated in Fig. 2, where it is converted to a more useful unidirectional voltage.

The output of rectifier 38 is supplied to two similar but separate groups of elements. As viewed in Fig. 2, the upper group of elements performs a carrier-current starting function and will be called a carrier-start group, while the lower group of elements performs a coordination function in cooperation with the ground tripping relay Gt and will be called a coordinating group. The coordinating group will be further described below. In the carrier-start group, one terminal of a filter capacitor 39 is connected through a rectifying element 40 to the positive terminal of rectifier 38. The function of rectifying element 40 will be explained in connection with the coordinating group of elements below. The other terminal of filter capacitor 39 is connected to negative bus respresented by the symbol (—). (The symbols + and — are used throughout the drawings to represent the positive bus and negative bus respectively of a unidirectional supply voltage source, such as a battery, which has not been shown for the sake of drawing simplicity.) A potentiometer 41 is connected across capacitor 39. Filter capacitor 39 smooths the rectified unidirectional voltage, and potentiometer 41 provides an adjustable means to select the magnitude of voltage and thus the value of residual current to which the carrier-start group will respond.

Associated with the potentiometer 41 is a drop-out delay circuit. The function of this delay circuit is to delay only the decay of voltage, whereby the transmission of carrier-current will be maintained for a predetermined length of time after an external ground fault has been cleared to permit other relays and the power system to return to normal conditions. Although other suitable arrangements may be employed to fulfill this function, we prefer at present to use a novel combination of elements which, as shown in Fig 2, comprise a rectifier 42 connected to the slider of potentiometer 41, a resistor 43 and capacitor 44 connected in series circuit relationship between rectifier 42 and the negative terminal of the potentiometer, and another rectifier 45 connected across resistor 43. The rectifier 42 permits the charging of capacitor 44 in response to an increasing voltage level across potentiometer 41 but prevents discharge current from flowing through potentiometer 41 when the voltage is decreased or removed. A resistor 43 having a relatively high value of resistance is used to minimize loading and therefore substantially to prevent the delay circuit from draining appreciable power from the voltage signal passing through. Rectifier 45 is arranged to present substantially infinite impedance to capacitor charging current during increasing voltage across potentiometer 41 and to provide a shunt path having negligible resistance around resistor 43 for capacitor discharging current. Whenever potentiometer voltage is reduced or removed, capacitor 44 will discharge directly into the succeeding relay circuit. Our drop-out delay circuit will not adversely affect the build-up time and magnitude of a voltage signal supplied to the succeeding relay circuit in response to increasing residual current, but whenever the residual current is reduced, regardless of its rate of decrease, the voltage signal will be maintained for a period of time determined by the capacitance of and the change accumulated by capacitor 44, and by the resistance of the discharge path in the succeeding circuit.

The succeeding relay circuit comprises a level detector 46 which has been shown in block form in Fig. 2. For the purposes of this specification the term level detector is used to designate a device such as an electronic switch, i.e., means responsive to an input signal of at least a predetermined instantaneous value for producing substantially instantaneously an output signal of predetermined constant characteristic Any suitable circuit can be used for level detector 46. For example, the arrangement shown in Fig. 1 of a copending application S.N. 500,475, filed on April 11, 1955, by Merwyn E. Hodges and Harold T. Seeley and assigned to the present assignee, which is described in detail and claimed therein, is particularly well suited. Such a circuit has the desirable features of extremely fast pickup and cutoff times selectable pickup with respect to input signal level, and a high degree of accuracy which is maintained during fluctuations of supply voltage and variations of ambient temperature. Level detector 46 produces a constant magnitude output voltage substantially instantaneously when supplied by an input signal produced in response to residual current of at least a predetermined value corresponding to a ground fault. This output voltage will be maintained for a certain period of time after removal of the ground fault due to the action of the drop-out delay circuit described above.

The output voltage of level detector 46 supplies control grid 47a of a cathode follower vacuum tube 47. The anode or plate of tube 47 is connected directly to the positive bus, while the cathode is connected through a cathode resistor 48 to negative bus. The cathode heater and heater circuit, being well known to those skilled in the art, have been omitted for the sake of drawing simplicity. Presence of the level detector 46 output voltage on grid 47a causes full conduction by the tube, and the resulting voltage drop across resistor 48 provides an output control signal from a low impedance source. By means of a conductor 49 connected to the positive terminal of resistor 48, this signal is supplied to control relay CR, shown in Fig. 3. In a manner to be described below, this signal starts the transmission of carrier-current from the associated transmitter T.

The minimum time required by the ground starting relay Gs (carrier-start function), to produce an output control signal in response to the occurrence of a ground fault in a 60 cycles per second electric power system has been found by tests to be less than .001 second, and the maximum time has been found to be less than .007 second. The exact time required within these limits is determined by the magnitude of fault current and the portion of a half cycle at which it is initiated.

Consider now the coordinating group of elements of the ground starting relay Gs. As shown in Fig. 2, one terminal of a filter capacitor 50 is connected through contact 29 of the electromagnetic relay 27 to the positive terminal of rectifier 38. The other terminal of filter capacitor 50 is connected to negative bus. Voltage may be applied to capacitor 50 only when contact 29 is closed, which indicates that all three poles of circuit breaker 14 are closed. Thus, the coordinating group will always be deenergized during sequential pole closure of the associated circuit breaker. A potentiometer 51 is connected across capacitor 50. Filter capacitor 50 smooths the rectified unidirectional voltage, and potentiometer 51 provides an adjustable means to select the magnitude of voltage, and thus the value of residual current, at which the coordinating group will respond. By providing separate adjustable means for the carrier-start group of elements and for the coordinating group of elements in ground starting relay Gs, a high degree of flexibility is obtained in the relative responsiveness of these two groups. To aid in obtaining correct operating sequence of the relaying system, the potentiometers 41 and 51 typically are adjusted to render the carrier-start group of the local relay Gs more sensitive than the coordinating group of the remote relay Gs, i.e., the carrier-start group at terminal 14 is adjusted to respond at a lower value of residual current than will the coordinating group at terminal 15.

Rectifier 40, which has been mentioned in connection with the carrier-start group of elements above, is needed to prevent capacitor 39 from discharging through potentiometer 51. During sequential pole closure of circuit breaker 14, unbalanced line currents may flow although no ground fault exists. The resulting residual current may cause capacitor 39 to charge. (Capacitor 50 can not charge because contact 29 is open.) After all poles are closed, electromagnetic relay 27 is energized to close contact 29 which, except for the blocking of rectifier 40, would set up a discharge path for capacitor 39 through potentiometer 51 thereby falsely energizing the coordinating group.

The slider of potentiometer 51 is connected to another level detector 52, shown in block form in Fig. 2, which preferably is similar to level detector 46 used in the carrier-start group of elements. The output voltage of level detector 52 is supplied to a control grid 53a of a cathode follower vacuum tube 53. The plate of tube 53 is connected directly to the positive bus, while the cathode is coupled by a capacitor 54 to negative bus. An inductor 57 in series circuit relationship with a resistor 60 provides the necessary D.-C. path from cathode to negative bus. Grid 53a is energized and full conduction is attained by tube 53 substantially instantaneously in response to residual current of predetermined value corresponding to a ground fault.

Conduction by tube 53 establishes unidirectional voltage across capacitor 54 which is supplied to a time delay circuit 55. The output voltage of time delay circuit 55 comprises the coordinating signal which is supplied by a conductor 56 to the ground tripping relay Gt where it supervises the output of a tripping control signal. As will be clear when the ground tripping relay Gt is described below, the coordinating signal must have positive polarity with respect to negative bus and must be greater than a predetermined magnitude before an effective output control signal can be produced by relay Gt. The delay introduced in the coordinating signal by the time delay circuit 55 is necessary to insure that the ground starting relay Gs at the remote terminal (15) has opportunity to start carrier-current before an effective output control signal can be produced by the local ground tripping relay Gt. This permits blocking to be established and prevents false tripping of the local circuit breaker during an external ground fault located beyond the remote terminal, such as shown at B in Fig. 1. The time delay is desirable for another reason which will be brought to light during the description of the ground tripping relay Gt below. For correct operation of the relaying system illustrated as a preferred embodiment of our invention, a delay period of approximately .006 second is required.

Any suitable circuit may be used to perform this time delay function, but we prefer at present to use a novel arrangement of elements especially adapted for the purposes of the illustrated embodiment of our invention. Our time delay circuit 55, which provides an extremely accurate and reliable time delay, comprises a series inductor 57-capacitor 58 element connected to be charged by the unidirectional voltage established across capacitor 54, a second inductor 59 electrically connected in series circuit relation to inductor 57 and magnetically coupled thereto by means of a common iron core, and a resistor 60 connected across capacitor 58. As can be seen in Fig. 2, conductor 56 is connected to the second inductor 59, and the output voltage of the time delay circuit comprises the voltage from negative bus across capacitor 58 added to the voltage across inductor 59. The two inductors have substantially equal turns and their polarities are arranged so that increasing charging current to capacitor 58 through inductor 57 induces a voltage in inductor 59 which tends to make conductor 56 negative, while decreasing charging current induces a voltage which tends to make conductor 56 positive.

The operation of our time delay circuit 55 is as follows: Upon the initiation of conduction in cathode follower tube 53, voltage builds up across capacitor 54, as represented by the broken line curve $V_{54}$ in Fig. 4, and charging current begins to flow through the inductor 57 to capacitor 58. The charging current increases to a peak value and then decays until capacitor 58 is fully charged. Positive voltage increases across capacitor 58 first with an increasing then with a decreasing rate of change. The voltage induced in inductor 59 at first is negative but will become positive when the charging current decays from its peak value. The output voltage is the sum of these two voltages and is represented by the solid line curve $V_{56}$ in Fig. 4. The predetermined magnitude of positive voltage required to permit ground tripping relay Gt to produce an effective control signal is represented in Fig. 4 by line 61, and it can be seen that the output voltage passes through this critical voltage level at a very rapid rate of increase. This feature of our time delay circuit produces an accurate time delay which is substantially insensitive to fluctuations of supply voltage or critical voltage level. The steady state value of output voltage is essentially equal to the voltage across capacitor 58 which is the same as the voltage across capacitor 54. When load current flows in conductor 56 there will be a small voltage drop in inductors 57 and 59, due to the resistance of their windings. Resistor 60 is provided to improve damping action of the circuit thereby substantially to prevent oscillation of the output voltage. The capacitance of capacitors 54 and 58 and the inductance of inductor 57 are selected whereby a coordinating signal of proper polarity and magnitude is produced by the time delay circuit 55 approximately .006 seconds after energization of cathode follower tube 53.

The illustrated ground starting relay Gs will produce a coordinating signal for supervising the output of ground tripping relay Gt within the range of .007 to .013 second following the occurrence of a ground fault.

*Ground tripping relay Gt*

The ground tripping relay Gt, illustrated in Fig. 2, operates to stop carrier-current transmittal and to attempt tripping of circuit breaker 14 in response to the occurrence of a ground fault in the direction of the protected transmission line. This relay determines if ground current is flowing toward the protected transmission line by comparing the phase angle between two alternating electric quantities derived from the power system when-ever ground current flows. One of the two electric quantities will be called the operating quantity and comprises current in the residual circuit 22 of current transformers 16, 17, and 18. The other quantity will be called the reference or polarizing quantity and can comprise either zero sequence voltage taken from a broken delta connection of the secondary windings of potential transformers 19, 20, and 21 which have wye connected primary windings, as shown in Fig. 2, or, in the alternative, current taken from a transformer 71 coupled to the neutral connection of a grounding transformer bank 72, as shown in Fig. 5. The choice of either voltage or current polarizing quantity is one of convenience and economics and depends upon the availability of a grounding bank neutral connection at the particular power system terminal. Relay Gt uses the phase angle between residual current and polarizing quantity to determine whether the residual current, and thus the ground current, is flowing internally (toward the protected line) or externally (away from the protected line).

Consider first the reference or polarizing channel of relay Gt. The alternating zero sequence voltage is supplied to suitable transforming means such as the iron-core transformer 73 illustrated in Fig. 2. Transformer 73 derives a polarizing voltage representative of the zero sequence voltage both in magnitude and phase while insulating succeeding relay circuits from the potential transformer connections. In the alternative arrangement shown in Fig. 5, wherein grounding transformer bank 72 neutral current is used as the polarizing quantity, transformer 71 is connected to a suitable transforming means 74 which, for the purposes of the illustrated embodiment of our invention, preferably is similar to transforming means 36 previously described in connection with ground starting relay Gs. Transforming means 74 derives a polarizing voltage which is representative of the neutral current both in magnitude and phase. A voltage limiter 75, which may be similar to limiter 37 also described in connection with relay Gs, is connected across secondary winding of transforming means 74 to limit the maximum possible peak value of induced voltage to a safe level.

The polarizing voltage derived by transforming means 73 (or 74) serves as a control signal for a squaring amplifier 76. The squaring amplifier is employed to shape the alternating polarizing voltage into rectangular wave form. Although we do not wish to be limited thereto, the preferred form of squaring amplifier, as shown in Fig. 2, comprises a high-mu triode vacuum tube 76 which changes from cutoff to full conduction in response to only a very small change in the voltage level of its grid 76a. A parallel resistor 77—capacitor 78 element is connected between negative bus and cathode 76b of tube 76 to permit symmetrical operation of the amplifier. This element establishes the average cathode potential at a positive level whereby a grid voltage of zero volts with respect to negative bus lies halfway between the values of grid voltage required for cutoff and for full conduction. The polarizing voltage is applied between negative bus and the grid 76a. A grid resistor 79 limits grid current whenever the grid 76a is positive with respect to cathode 76b. Transformer coupling is provided in the plate circuit of tube 76. A primary winding 80a of an iron core transformer 80 is connected between plate 76c and positive bus. As long as no voltage is applied to grid 76a, tube 76 is conducting quiescent current of relatively constant magnitude. Whenever polarizing voltage is applied to grid 76a, the tube will conduct increasing current during approximately the entire period of each positive half cycle of polarizing voltage and decreasing current during the period of each negative half cycle, and an alternating, substantially square wave polarizing voltage signal will be induced in transformer secondary winding 80b. The amplitude of the polarizing voltage signal is independent of the magnitude of the polarizing quantity which produced it, but the voltage signal has a fixed phase relation to the polarizing quantity, i.e., positive and negative half cycles of the square wave polarizing voltage signal have a fixed time relationship to the positive and negative half cycles of zero sequence voltage or, in the alternative, of grounding bank neutral current.

Consider now the operating channel of relay Gt. The residual current in circuit 22 is supplied to a transforming means 81, which, as shown in Fig. 2, is similar to transforming means 36 described above in connection with relay Gs. Transforming means 81 derives a voltage which represents the residual current both in magnitude and phase. A voltage limiter 82 is provided, as was the case for limiter 37, to limit the maximum possible peak value of induced voltage to a safe level.

For the voltage polarized arrangement illustrated in Fig. 2, a rheostat 83 is provided to load the transforming means 81 thereby to shift the phase relationship of the derived voltage with respect to the residual current. Rheostat 83 is adjusted so that the derived operating voltage leads the residual current by sixty electrical degrees. This is desirable for reasons that will become apparent below. For the current polarized arrangement, as shown in Fig. 5, the rheostat is omitted and the operating voltage derived by transforming means 81 is representative of the phase of the residual current as in the case of transforming means 74.

The operating voltage serves as a control grid signal for another squaring amplifier 84. This device preferably is the same as amplifier 76 used to square the polarizing voltage, and, as described above, includes a high-mu triode vacuum tube 84, a parallel resistor 85—capacitor 86 element for biasing the cathode, a grid resistor 87, and a primary winding 88a of a transformer 88 connected in the plate circuit. The transformer secondary winding 88b produces an alternating, substantially square wave operating voltage signal having independent amplitude but fixed phase relation to the residual current.

With the various transformers connected as shown in Figs. 2 and 5, during a typical internal ground fault, with ground current flowing toward the protected transmission line, the relationship between operating and polarizing quantities is as follows: residual current is in phase with grounding bank neutral current (Fig. 5); residual current lags zero sequence voltage by sixty electrical degrees (Fig. 2). It therefore follows that in the current polarized arrangement, the operating voltage signal is substantially in phase with the polarizing voltage signal whenever ground current flows toward the protected transmission line, and in the voltage polarized arrangement, due to the sixty degree phase shift established by rheostat 83, the operating voltage signal is again substantially in phase with the polarizing voltage signal whenever ground current flows toward the protected line. Whenever ground current flows away from the protected transmission line, during a typical external ground fault, the residual current will reverse 180 electrical degrees with respect to the above relationships, and the operating voltage signal will become substantially 180 electrical degrees out of phase with respect to the polarizing voltage signal. To develop a resultant signal which will indicate the phase relationship between operating and polarizing voltage signals, and thereby indicate the location of a ground fault, we provide a phase discriminating circuit which will now be described.

Two voltage dividing resistors 89 and 90 having equal values of resistance are connected in series circuit relationship across the transformer secondary winding 80b, and the common point between these resistors is connected to negative bus. The polarizing voltage signal appearing across the pair of resistors 89 and 90 is supplied to the phase discriminating circuit shown in Fig. 2. The transformer 88 is loaded by an impedance element 91 having a non-linear current voltage characteristic connected across secondary winding 88b. This element preferably is similar to the voltage limiter 37 described above in connection with ground starting relay Gs, and it is employed to limit the operating voltage signal of transformer 88 to a value which is always less than the value of the polarizing voltage signal across resistors 89 and 90. By using a non-linear element, the limiting effect is greatest at peak values of voltage and therefore the squareness of the operating voltage signal waveform is improved. This signal is also supplied to the phase discriminating circuit. The phase discriminating circuit operates to develop a substantially constant magnitude resultant unidirectional voltage across a resistor 92 whenever the polarizing and operating voltage signals have like polarities.

Although other suitable phase discriminating circuits can be used, for the purposes of the illustrated embodiment of our invention we have been able to obtain particularly desirable results by using the novel arrangement now claimed in a copending divisional patent application S.N. 705,962, filed on December 30, 1957, by Merwyn E. Hodges and Norman A. Koss and assigned to the present assignee. With this arrangement, the operating voltage drives current through resistor 92 to produce a unidirectional voltage, while the polarizing voltage performs a supervising function and renders the operating voltage ineffective to produce unidirectional voltage whenever these two input voltages have opposite polarities. As can be seen in Fig. 2, two rectifiers 93 and 94 are connected in series circuit opposing relationship across the pair of resistors 89 and 90, and the common point between these rectifiers is connected to the common point between the resistors. This common point is connected to one terminal of resistor 92 and is also tied to negative bus. The terminal of transformer secondary winding 80b which is connected to resistor 89 and rectifier 93 has been marked with the reference letter C in Fig. 2, and the opposite terminal has been marked D. Whenever terminal C is positive polarity with respect to terminal D, rectifier 93 will act as a shunt path around resistor 89 and substantially the entire polarizing voltage signal will appear across resistor 90. Similarly, whenever terminal C is negative with respect to terminal D, rectifier 94 will act as a shunt path around resistor 90 and substantially the entire polarizing voltage signal will appear across resistor 89. A second pair of series connected opposing rectifiers 95 and 96 are connected across impedance element 91. The common point between these rectifiers is connected to the other terminal of resistor 92, and rectifiers 95 and 96 are arranged to permit the flow of current only in the direction toward resistor 92. The terminals of transformer secondary winding 88b corresponding to terminals C and D of secondary winding 80b have been marked by the reference letters E and F respectively. Opposite terminals of the secondary windings 80b and 88b are interconnected through rectifiers 97 and 98, with rectifier 97 arranged to permit current flow only in the direction from terminal C toward terminal F, and rectifier 98 arranged to permit current flow only in the direction from terminal D toward terminal E.

To understand the operation of our discriminating circuit, assume first that the operating and polarizing voltage signals have like polarities and that terminal C is negative with respect to terminal D. It necessarily follows that terminal E is negative with respect to terminal F. Due to rectifier 94, terminal D can be no more positive than negative bus; therefore the potential of terminal D is equal to the potential of negative bus. In other words, both sides of rectifier 94 are at substantially the same potential of negative bus. Therefore it is possible for load current to flow from the relatively positive terminal F of transformer secondary winding 88b through rectifier 96 and resistor 92 to negative bus and hence through rectifiers 94 and 98 to terminal E, and a resultant unidirectional voltage is developed across resistor 92. Although this load current appears to flow backwards through rectifier 94, it will be observed that net current through rectifier 94 is in its forward direction due to current from terminal D of transformer secondary winding 80b which follows this shunt path around resistor 90 and which is greater than the load current.

Next assume that the polarity of the operating voltage signal reverses with respect to the polarity of the polarizing voltage signal. Terminal C remains negative with respect to terminal D, but now terminal E is positive with respect to terminal F. As reasoned above, the potential at terminal D is equal to the potential of negative bus and, therefore, terminal C is negative with respect to negative bus. Transformer 88 tends to drive current from terminal E through rectifier 95 and resistor 92 to negative bus and thence through resistor 89 and rectifier 97 to terminal F. But, in order for rectifier 97 to pass this current, terminal F must be more negative than terminal C. Since the value of operating voltage is always of lower magnitude than the value of polarizing voltage, the potential of terminal F cannot be more negative than the negative potential of terminal C even with terminal E at negative bus potential. Therefore, rectifier 97 is non-conductive and no load current can flow through resistor 92. As a result, no resultant voltage is developed.

Due to the symmetry of the phase discriminating circuit, its operation will be similar to that described above whenever terminal C is positive with respect to terminal D.

During a typical internal ground fault the operating and polarizing voltage signals are in phase, and a continuous unidirectional voltage will be developed by our phase discriminating circuit. During a typical external ground fault the two voltage signals are 180 electrical degrees out of phase, and no voltage will be developed. For each variation of phase angle between these two extremes, a resultant unidirectional voltage impulse having a duration determined by the overlap of like polarities will be developed every one half cycle. Thus the duration of the resultant voltage during each half cycle indicates the phase angle between the operating and polarizing voltage signals and consequently indicates the phase angle between the residual current and the polarizing quantity.

The positive terminal of resistor 92 is connected to a level detector 99 shown in block form in Fig. 2. Level detector 99, which may be similar to the level detector 46 used in connection with ground starting relay Gs, produces a constant magnitude unidirectional voltage substantially instantaneously in response to a low value of the resultant voltage across resistor 92. The purpose of the level detector 99 is to provide amplified voltage impulses each having a magnitude which remains constant regardless of the amplitude, above the aforesaid low value, of the resultant voltage across resistor 92, and each having an improved rectangular wave shape.

The output voltage of level detector 99 supplies control grid 100a of a cathode follower vacuum tube 100. Cathode 100b of tube 100 is connected through a tapped cathode resistor 101 to negative bus, while plate 100c is connected to a source of regulated positive potential 102. The source of regulated positive potential 102, as shown in Fig. 2 by way of example, comprises a resistor 103 in series circuit relationship with a cold cathode voltage regulating OA3/VR75 gas tube 104 connected between positive and negative buses. This combination is relatively insensitive to fluctuations of supply voltage, and the positive voltage of plate 100c is thereby held substantially constant. Because variations of grid voltage affect the conductance of a vacuum tube, a rectifier 105 is provided between the grid and plate circuits of tube 100 to limit the magnitude of the voltage impulses produced by level detector 99 to the substantially constant value of plate voltage. A grid resistor 106 is provided to limit grid current thereby further stabilizing the operation of tube 100. As a result, cathode follower 100, in response to energization of grid 100a by the output voltage of level detector 99, provides across tapped resistor 101 a voltage drop of substantially constant magnitude regardless of the amplitude of the resultant voltage impulses from the discriminator circuit and regardless of fluctuations of supply voltage.

Another level detector 107 is connected through a time interval detecting circuit to cathode resistor 101. Level detector 107, shown in block form in Fig. 2, derives a unidirectional output voltage of constant magnitude substantially instantaneously when energized by a voltage of at least a predetermined pickup value and maintains said output voltage until the energizing voltage is reduced to less than a predetermined cutoff value. Any suitable circuit can be used for level detector 107. For example, the arrangement shown in Fig. 3 of the aforesaid copending application S.N. 500,475 filed by Merwyn E. Hodges and Harold T. Seeley is particularly well suited.

The time interval detecting circuit controls the energization of level detector 107. This circuit measures the duration of each voltage impulse appearing across resistor 101, applies voltage of the predetermined pickup value to level detector 107 in response to a voltage impulse of at least a first predetermined duration, maintains voltage of greater than the predetermined cutoff value for at least a second predetermined length of time, and quickly resets when the applied voltage becomes less than cutoff value. Although other suitable time interval detecting circuits can be used, we prefer at present a novel arrangement of elements especially adapted to fulfill the needs of the illustrated embodiment of our invention. The time interval detecting circuit, which is now claimed in our aforesaid copending divisional application S.N. 705,962, comprises a resistor 108 and a timing capacitor 109 connected in series circuit relationship across cathode resistor 101. One terminal of capacitor 109 is connected to negative bus. A rectifier 110 is connected from the positive terminal of capacitor 109 to an adjustable slider 111 which taps a portion of resistor 101. Rectifier 110 is arranged to permit easy current flow only from the positive terminal of capacitor 109 toward slider 111. In response to the voltage drop across resistor 101 produced by a resultant voltage impulse, charging current will flow through resistor 108 to timing capacitor 109. The time constant of this charging circuit is selected so that capacitor 109, in parallel combination with a capacitor 114, will charge to the predetermined pickup value of voltage of level detector 107 whenever the resultant voltage impulse is maintained for a first predetermined period of time. The maximum voltage level to which capacitors 109 and 114 can charge is determined by the portion of voltage drop across resistor 101 which is tapped by slider 111. Slider 111 is adjusted so that the maximum level is only slightly greater than the pickup value of voltage. As the end of each voltage impulse, timing capacitor 109 rapidly discharges through rectifier 110 and the tapped portion of resistor 101.

An alternative arrangement whereby timing capacitor 109 discharges even more rapidly is illustrated in Fig. 6. Another cathode follower vacuum tube 112 is employed in this modification. The grid of tube 112 is energized by the output voltage of level detector 99 through grid resistor 106a, the cathode of tube 112 is connected through a cathode resistor 113 to negative bus, and the plate is connected to the source of regulated positive potential 102. Grid resistor 106a prevents loading of the output of level detector 99 by grid current flow. Cathode resistor 113 performs the same function as the tapped portion of resistor 101 in Fig. 2. Since the value of resistance of resistor 113 can be much less than that of the tapped portion of resistor 101, while maintaining the same maximum voltage level, the time required to discharge capacitor 109 at the end of each voltage impulse is correspondingly less for the modification of Fig. 6. Rapid discharge is of course desirable to enable timing capacitor 109 to accurately time each voltage impulse unencumbered by residual charge remaining from the immediately preceding impulse. Limiting the maximum voltage level to slightly greater than pickup value contributes to the rapid discharge feature of our circuit.

The time interval detecting circuit, as shown in Fig. 2, includes a variable holding capacitor 114 in parallel circuit relationship with a resistor 115 coupled to timing capacitor 109. One terminal of capacitor 114 is connected to negative bus and the other terminal is connected through a rectifier 116 to the positive terminal of capacitor 109. Rectifier 116 is arranged to permit capacitor 114 to charge simultaneously with capacitor 109 but to prevent discharge of capacitor 114 through the discharge path of capacitor 109. At the end of each voltage impulse, holding capacitor 114 discharges through resistor 115. The value of capacitance of capacitor 114 and the value of resistance of resistor 115 are selected whereby a second predetermined time interval is required for the voltage across capacitor 114 to decay from the maximum level to the predetermined cutoff value. The positive terminal of capacitor 114 is connected to level detector 107 which responds to the pickup and cutoff values of voltage as discussed above.

The output voltage of level detector 107 supplies control grid 117a of a final cathode follower vacuum tube 117. Cathode 117b of tube 117 is connected through a cathode resistor 118 to negative bus, while plate 117c is connected to conductor 56. Tube 117 will conduct current only when grid 117a is energized by the output voltage of level detector 107 and plate 117c is energized by a positive polarity coordinating signal which is produced by ground starting relay Gs. Conduction by tube 117 develops a voltage drop across resistor 118 which provides an output control signal from a low impedance source. The output control signal reaches an effective value as soon as the coordinating signal from relay Gs exceeds its predetermined critical level. By means of a conductor 119 connected to the positive terminal of cathode resistor 115, this output control signal is supplied to control relay CR, shown in Fig. 3. In a manner to be described below, an effective output control signal stops the transmission of carrier-current from the associated transmitter T and attempts to trip circuit breaker 14.

For the purposes of the illustrated embodiment of our invention, it is desirable to prevent an output control signal whernever the operating voltage signal is greater than ±90 electrical degrees out-of-phase with the polarizing voltage signal. In this range the resultant voltage impulses developed every half cycle by the phase discriminating circuit are of less than 90 electrical degrees duration. Therefore, the first predetermined period of time in the time interval detecting circuit is selected to be approximately .0042 second (or 90 degrees on a 60 cycle per second basis), and the pickup value of energizing voltage for level detector 107 is not reached until a resultant voltage impulse exceeds 90 degrees duration. As a result, no output control signal can be produced by ground tripping relay G*t* as long as the phase angle between operating and polarizing voltage signals differs from the typical 180 degrees out-of-phase external ground fault condition by less than 90 degrees, and within these limits are included all possible relationships between operating and polarizing quantities whenever ground current is flowing away from the protected transmission line.

It has been found that ground current flowing toward the protected transmission line is substantially always within ±60 electrical degrees of its typical internal ground fault relationship. Consequently, it is desirable to be able to produce a continuous output control signal whenever the operating voltage signal is less than 60 electrical degrees out-of-phase with the polarizing voltage signal. Within this range, the gaps between successive voltage impulses developed every half cycle by the discriminating circuit are of less than 60 degrees interval. Therefore, the second predetermined time interval in the time interval detecting circuit is approximately .0028 second (or 60 degrees on a 60 cycle per second basis), and the energizing voltage for level detector 107 is maintained above cutoff value as long as the gaps between resultant voltage impulses are less than 60 degrees duration.

Under certain system conditions it is possible that prior to the occurrence of an external ground fault the resultant voltage impulse developed by the phase discriminating circuit may last for longer than 90 electrical degrees. For example, resultant impulses of greater than 120 degrees duration may be produced during a previously unbalanced load condition. Therefore, it is essential in order to prevent false operation whenever an external ground fault develops to delay the output control signal until the time interval detecting circuit has an opportunity to reset, i.e., until the effects of an initial long voltage impulse can be discharged. The delay is conveniently provided by the time delay circuit 55 described above in connection with the ground starting relay G*s*. Since no output control signal can be produced by relay G*t* until a delayed coordinating signal is received from relay G*s*, correct operation is assured without adversely affecting the overall operating time required by relay G*t* to energize grid 117*a* of the final cathode follower 117.

The time required by ground tripping relay G*t* to energize grid 117*a* in response to the occurrence of an internal ground fault in a 60 cycles per second electric power system has been found to be between .004 and .011 second, with the exact time determined by the phase angle between operating and polarizing quantities and the portion of a half cycle at which the fault is initiated. An effective output control signal is produced under the supervision of the delayed coordinating signal within .007 to .013 second following the occurrence of an internal ground fault.

Since ground tripping relay G*t* operates substantially independently of ground current magnitude, grid 117*a* may be energized in response to unbalanced load conditions as well as in response to faults. However, no coordinating signal can be received and consequently no output control signal will be produced until a fault occurs.

Conductor 119 branches into conductors 119*a* and 119*b* as shown in Fig. 3. Conductor 119*a* is connected to control relay CR, while conductor 119*b* enters tripping auxiliary unit TX where it connects through a rectifier 204 to one terminal of a normally open contact 196 of a seal-in electromagnetic relay 191 which is energized in response to energization of the circuit breaker trip coil 31. The other terminal of contact 196 is connected to a conductor 120 which returns to ground tripping relay G*t* shown in Fig. 2 and connects to a trigger circuit for a perceivable operation indicator or target 121. In this manner the output control signal of relay G*t* is employed to operate target 121 as soon as tripping of circuit breaker 14 is initiated.

As shown in Fig. 2, the preferred target comprises a glow discharge tube 121, such as a NE16 neon tube. This tube in series circuit relationship with a normally closed push button reset switch 122 is connected across a resistor 123. Resistor 123 is connected to negative bus and through another resistor 124 to positive bus. The normal voltage across tube 121 is sufficient to sustain conduction once started, but an additional voltage impulse is needed to trigger the tube and initiate conduction. A resistor 125 is connected between negative bus and conductor 120, and the output control signal of relay G*t* is applied to this resistor in response to energization of circuit breaker trip coil 31. A capacitor 126 is connected between the positive terminals of resistors 123 and 125, and, since voltage across a capacitor cannot change instantaneously, application of the output control signal to resistor 125 causes a momentary impulse of positive voltage at the positive terminal of resistor 123 which triggers tube 121. While conducting, tube 121 furnishes a visual indication that relay G*t* has operated to cause circuit breaker 14 to open. By manual operation of the push button reset switch 122, conduction by tube 121 can be stopped.

Control relay CR

Control relay CR operates to convert the output control signals of ground starting and tripping relays, G*s* and G*t* respectively, into suitable signals for energizing the carrier-current transmitter T and for initiating tripping of circuit breaker 14 respectively. Within relay CR the control signal from relay G*t* effectively deenergizes transmitter T and stops carrier-current by blocking the control signal of relay G*s*. Certain components comprising the illustrated embodiment of control relay CR and the functions of these components are generally set out below. These components and preferred circuits therefor are described in detail and claimed in a copending patent application S.N. 471,593, filed on November 29, 1954, by Merwyn E. Hodges and assigned to the present assignee.

As can be seen in Fig. 3, conductor 49, which conveys the output control signal from relay G*s* to relay CR, is connected to an oscillator 170 and to an amplifier 171 both shown in block form. Oscillator 170 is employed to convert the unidirectional control signal into an alternating voltage. The alternating voltage output of oscillator 170 is supplied to amplifier 171 which amplifies this voltage under the selective control of the signal from relay G*s*. In the absence of a control signal, no output can be produced by amplifier 171. The amplified alternating voltage is supplied to a push-pull amplifier 172, shown in block form, where proper power content is imparted to this voltage signal. Unidirectional control voltage is provided for push-pull amplifier 172 by a suitable rectifier 173 and filter capacitor 174 supplied by the alternating voltage output of amplifier 171. The output voltage of push-pull amplifier 172 is supplied to a rectifier 175, shown in block form, which rectifies the alternating voltage and produces a positive polarity unidirectional voltage starting signal having sufficient power content to energize carrier-current transmitter T. By means of a conductor 176, the starting signal is transmitted via tripping auxiliary unit TX to transmitter T. By using suitable improved electronic circuits for certain of the foregoing components, as described in the above mentioned copending application of Merwyn E. Hodges, S.N. 471,593, the control relay CR may be made to produce a starting signal within .0002 second following the arrival of the output control signal from relay G*s*.

Conductor 119a, which transmits the output control signal from relay Gt to relay CR, is connected to oscillator 170 and to an amplifier 177 shown in block form in Fig. 3. Oscillator 170 converts the unidirectional control signal into an alternating voltage which is supplied to amplifier 177. A control signal of effective value must be present to render amplifier 177 operable to produce an amplified alternating voltage. A suitable rectifier 178 is connected to amplifier 177 to change the amplified alternating voltage to a negative polarity unidirectional stopping voltage of relatively large magnitude. The stopping voltage is smoothed by the filter capacitor 179 and supplied to amplifier 171 and to push-pull amplifier 172 where it rapidly and positively cuts off these amplifiers and prevents their operation. In this manner, the carrier-current starting signal of relay Gs is blocked and transmitter T is deenergized. Another suitable rectifier 180 is connected to amplifier 177 and produces a positive polarity unidirectional voltage tripping signal which is filtered by a capacitor 181. A cathode follower 182, shown in block form, is connected to capacitor 181 and operates to change the impedance of the tripping signal source to a low level without appreciable loss in voltage amplitude. The output of cathode follower 182 is supplied by means of a conductor 183 to auxiliary relay OSC where it indicates that circuit breaker 14 should be tripped. By using suitable improved electronic circuits for certain of the foregoing components, as described in the above mentioned copending application of Merwyn E. Hodges, S.N. 471,593, the control relay CR may be made to produce a tripping signal within .0002 second and stop the starting signal in less than .0007 second following the arrival of an effective output control signal from relay Gt.

*Auxiliary relay*

Auxiliary relay OSC, as shown in block form in Fig. 3, operates to produce an alternating output voltage when energized by a tripping signal from control relay CR. The output voltage is supplied over a coaxial cable 184 to tripping auxiliary unit TX, and its presence at unit TX initiates tripping of circuit breaker 14 as will be described below. However, auxiliary relay OSC is also controlled by carrier-current receiver R. Receiver R, when energized as a result of carrier-current transmitted from the remote transmitter T, produces a negative voltage blocking signal; and this blocking signal, which is applied to relay OSC by means of a conductor 185, suppresses oscillations and renders OSC inoperable to produce output voltage. Thus, tripping of circuit breaker 14 is permitted only when no carrier-current is being transmitted at the remote terminal of the protected transmission line. It should be apparent that no carrier-current is transmitted from either terminal when ground tripping relay Gt at both terminals "sees" an internal ground fault, and this is the condition in response to which tripping is desired.

Any suitable circuit can be used as auxiliary relay OSC. For example, a particularly well suited oscillator arrangement is described and claimed in the aforesaid copending application S.N. 471,593, filed by Merwyn E. Hodges. An oscillator such as the one referred to is capable of producing output voltage, in the absence of a blocking signal from receiver R, within .0002 second in response to energization by a tripping signal.

*Tripping auxiliary unit TX*

Tripping auxiliary unit TX, which is shown in Fig. 3, operates to energize trip coil 31 of circuit breaker 14 in response to receipt of the alternating output voltage from the auxiliary relay OSC. Auxiliary electromagnetic relays are included to provide certain circuit controlling functions in response to operation of unit TX. Certain elements of the illustrated embodiment of tripping auxiliary unit TX are generally set out below. All components of this unit and preferred circuits therefore are described in detail and claimed in Patent 2,845,582 issued on July 29, 1958 to Norman A. Koss.

Coaxial cable 184, as can be seen in Fig. 3, terminates at primary winding 186a of a powdered iron core transformer 186 which is used as an isolating means as well as a voltage transforming means. Transformer secondary winding 186b is connected to a suitable rectifier element 187 wherein a unidirectional voltage is produced in response to the alternating output voltage of relay OSC. This unidirectional voltage, which is smoothed by a filter capacitor 188, is of sufficient magnitude to trigger a thyratron element 189. When thyratron 189 fires, it conducts a relatively large tripping current which follows a path from positive bus through the operating coils of two seal-in electromagnetic relays 190 and 191, through thyratron 189, through an auxiliary switch 192 of circuit breaker 14, and through the trip coil 31 to negative bus. This current energizes the trip coil 31 which actuates latch 32 thereby releasing switch member 33 for rapid circuit interrupting movement. The tripping current also energizes both seal-in relays 190 and 191 which operate in concert to close respectively normally open contacts 193 and 194. These contacts are connected in parallel circuit relationship and when closed form with the operating coil of a suppressor electromagnetic relay 195 a shunt path around thyratron 189 for tripping current flow.

A contact 196 of seal-in relay 191 completes an electrical circuit from conductor 119b to conductor 120 when seal-in relay 191 operates thereby permitting the output control signal of relay Gt to operate target 121 as described above in connection with relay Gt. Conductor 119b also connects to one terminal of a normally open contact 203 of the suppressor relay 195. The other terminal of contact 203 is connected to negative bus. Relay 195, which is energized when contact 193 or 194 closes, operates to suppress the output control signal of relay Gt by connecting this positive signal to negative bus. This is necessary to insure against false target indication in relay Gt which may operate during fault current interruption when the tripping of circuit breaker 14 has been initiated by phase tripping relay ϕt. A rectifier 204 is provided to prevent cutoff of target 121 which would otherwise result when conductor 119b is connected to negative bus through contact 203 of suppressor relay 195. When the suppressor relay 195 operates, the output control signal of relay Gt is removed. This situation is undesirable in that it permits the resumption of carrier-current transmission from the local terminal while trip coil 31 is energized with the result that tripping of remote circuit breaker 15 may be delayed momentarily or entirely blocked until after the local circuit breaker 14 has opened. Therefore, a normally closed contact 208 of seal-in relay 191 is provided in the circuit conveying the starting signal from control relay CR to transmitter T, and upon energization of trip coil 31 contact 208 opens to insure that transmitter T remains deenergized.

Seal-in relay 190 mechanically operates a perceivable indicator or target, not shown, to indicate that the tripping auxiliary unit TX has operated to trip circuit breaker 14.

As switch member 33 of circuit breaker 14 moves to its open circuit position, auxiliary switch 192 operates to interrupt tripping current thereby deenergizing trip coil 31, suppressor relay 195, and seal-in relays 190 and 191.

By using suitable improved circuits for certain of the foregoing elements, as described in the above mentioned Patent 2,845,582—Koss, the tripping auxiliary unit TX may be made to operate to energize trip coil 31 within .0003 second following receipt of output voltage from oscillator OSC.

Transmitter T and receiver R

Transmitter T and receiver R are employed as means for obtaining intercommunication between opposite terminals of the protected transmission line. Although, for the purpose of illustration, we have shown a relaying system using the well known carrier-current pilot for transmitting signals between terminals, it should be clear that other methods of intercommunication, such as wire pilot or microwave, lend themselves equally well to our system.

The carrier-current transmitter T, shown in block form in Fig. 3, generates a high-frequency continuous signal or carrier-current in response to energization by the starting signal from control relay CR. The carrier-current flows to conductor 13 of the protected transmission line through coupling capacitor 23. Conductor 13 provides a path for this current to the remote receiver R coupled to conductor 13 by another capacitor 23 at the remote terminal. Receiver R is tuned to the frequency of the carrier-current transmitted at the opposite terminal and is energized in response to this current to produce a negative voltage blocking signal which is conveyed to auxiliary relay OSC by conductor 185. Because the transmission of carrier-current is required only to prevent tripping, if conductor 13 should fail due to an internal ground fault, the relaying system would operate correctly to trip both circuit breakers 14 and 15.

The high frequency oscillation transmitter T and receiver R may be of any suitable construction. For example, the transmitter and receiver circuits disclosed and fully described in United States Letters Patent No. 2,087,127, issued to Sporn and Muller on July 13, 1937, are readily adaptable to perform the transmitting and receiving functions in the illustrated embodiment of our invention. By using an arrangement such as this, receiver R will produce its blocking signal within .0008 second following energization of the transmitter T located at the opposite terminal, and this blocking signal will be removed within .001 second following deenergization of the transmitter T.

The overall operating time required by the illustrated embodiment of our protective relaying system to energize the trip coils 31 of circuit breakers 14 and 15 following the occurrence of a ground fault on the protected transmission line is less than one cycle on a 60 cycle per second basis under all possible conditions. Within the limits of .002 to .008 second in response to a ground fault, ground starting relay Gs operates, control relay CR issues a starting signal, transmitter T transmits carrier-current, and receiver R responds by producing a blocking signal at auxiliary relay OSC. Within .009 to .015 seconds following any internal ground fault, ground tripping relay Gt operates, control relay CR responds to stop the starting signal and to energize relay OSC, transmitter T is deenergized and receiver R removes its blocking signal from relay OSC, tripping auxiliary unit TX operates, and trip coil 31 is energized. By tests conducted in a 60 cycles per second electric power system we have found that the average overall operating time of our relaying system is 5/8 cycle or approximately .011 seconds.

While we have shown and described a preferred form of our invention by way of illustration, many modifications will occur to those skilled in the art. We therefore contemplate by the appended claims to cover all such modifications as fall within the true spirit and scope of our invention.

What we claim as new and desire to secure by Letters Patents of the United States is:

1. A fault responsive protective relaying system for an alternating current electric power transmission line having circuit interrupting means at spaced apart terminals thereof comprising, a signal transmitting and a signal receiving means located at each terminal, signal channel means coupling each said transmitting means to the receiving means, fault detecting means located at each terminal and responsive to a first predetermined magnitude of one electric quantity derived from said transmission line to produce a first control voltage and to maintain said voltage for at least a predetermined period of time, first control means responsive to said first control voltage for energizing the associated said signal transmitting means, direction detecting means located at each terminal and responsive to a predetermined phase relationship between two electric quantities derived from the transmission line to produce a second control voltage, coordinating means located at each terminal and responsive to another predetermined magnitude of said one electric quantity to produce after a predetermined time interval a third control voltage, permissive means located at each terminal and controlled by the associated circuit interrupting means to permit the production of said third control voltage only when said circuit interrupting means is in its closed circuit position, voltage responsive means responsive to both said second and third control voltages to produce a resultant control voltage, second control means responsive to said resultant control voltage for deenergizing the associated said signal transmitting means, third control means operable in response to said resultant control voltage to initiate circuit interrupting operation of the associated circuit interrupting means, said third control means being rendered inoperable by the associated said signal receiving means upon receipt of a signal from said transmitting means, voltage responsive target means operable to produce a perceivable signal, fourth control means operable in response to operation of said third control means to deenergize the associated said signal transmitting means and to utilize said resultant control voltage to operate said target means, and means responsive to operation of said fourth control means for suppressing said resultant control voltage.

2. In a fault detecting protective relaying arrangement for a polyphase alternating current electric power system having a multipole circuit interrupter including tripping means, means responsive to a predetermined phase relation between two electric quantities derived from said system and having variable phase relationship with respect to each other for deriving a first voltage signal, coordinating means responsive to a predetermined magnitude of one of said electric quantities to produce after a predetermined time interval a second voltage signal, a deenergizing means operable whenever any pole of the circuit interrupter is open to deenergize said coordinating means thereby preventing the production of said second voltage signal, voltage responsive means supplied by said first and second voltage signals and operable only in response to the presence of both said signals to develop an output control voltage, control means responsive to said output control voltage for energizing the tripping means of the circuit interrupter, voltage responsive target means operable to produce a perceivable signal, and means responsive to energization of the tripping means for utilizing said control voltage to operate said target means.

3. A relaying arrangement for an alternating current circuit comprising, a directional relay operable to produce an operating voltage signal in response to a predetermined phase relationship between two electric quantities derived from the alternating current circuit and having variable phase relationship with respect to each other, an overcurrent relay responsive to one of said electric quantities to produce a supervising voltage signal after a predetermined time delay whenever the magnitude of said one electric quantity exceeds a predetermined amount, and voltage responsive means supplied by said operating and supervising voltage signals for developing an output control signal only in response to the presence of both said voltage signals.

4. An overcurrent relay for an alternating current electric circuit comprising, means for deriving a unidirectional voltage having a value determined by the magnitude of alternating current, time delay means supplied by said unidirectional voltage to delay only the decay of said voltage, and voltage responsive means connected to said time delay means and operable to derive an output control signal in response to unindirectional voltage of at least a predetermined value, whereby an output control signal is derived whenever the alternating current exceeds a predetermined magnitude and during a period of time determined by said time delay means subsequent to excessive alternating current.

5. A time delay electric circuit comprising, a pair of input terminals, a pair of output terminals one of which is connected to one of said input terminals, rectifying means interconnecting the other said terminals to prevent the transmission of electric energy from said output terminals toward said input terminals, a resistor and a capacitor connected in series circuit relationship across said output terminals, whereby unidirectional voltage applied to said input terminals will appear instantly across said output terminals and charge gradually said capacitor, and another rectifying means connected across said resistor to provide a shunt path around said resistor during discharging of said capacitor, whereby upon removal of the unidirectional voltage from said input terminals voltage decay at said output terminals will be delayed.

6. A voltage decay delay circuit for transmitting electric energy from a source of unidirectional voltage to a voltage responsive load comprising, a pair of input terminals connected to said source of unidirectional voltage, a pair of output terminals one of which is common to one of said input terminals, said output terminals coupled to said voltage responsive load, a first one-way electric valve interconnecting the other said terminals to permit transmission of electric energy only in a direction from said input terminals toward said output terminals, an energy storing circuit connected across said output terminals and including a capacitor connected in series circuit relationship with a resistor having a relatively high value of resistance thereby to limit the rate of voltage build up across said capacitor in response to an increase in magnitude of the unidirectional voltage supplied by said source to a relatively low value, and a second one-way electric valve connected across said resistor to provide a shunt path of negligible resistance for the discharge of energy stored by said energy storing circuit into said load following a decrease in magnitude of the unidirectional voltage supplied by said source.

7. An overcurrent relay for an alternating current electric circuit comprising, means for deriving a unidirectional voltage dependent upon the magnitude of alternating current, voltage responsive means supplied by said unidirectional voltage to produce a voltage signal of predetermined constant characteristics in response to unidirectional voltage of greater than a predetermined value, and time delay means connected to said voltage responsive means for producing an output control signal after a predetermined time interval following energization by said voltage signal.

8. An overcurrent relay for an alternating current electric circuit comprising, means for deriving a unidirectional voltage dependent upon the magnitude of alternating current, voltage responsive means supplied by said unidirectional voltage to derive a substantially constant magnitude unipolarity voltage signal in response to unidirectional voltage of greater than a predetermined value, and time delay means responsive to said unipolarity voltage signal for producing a delayed output control signal a predetermined time interval after energization by said unipolarity voltage signal.

9. An electric circuit for developing a unidirectional output voltage of predetermined polarity in delayed response to a unidirectional input voltage of corresponding polarity comprising, a pair of input terminals to which said input voltage is applied, a capacitor coupled to said input terminals thereby to be charged when said input voltage is applied, inductive means having a first winding connected in the charging circuit of said capacitor and a second winding magnetically coupled to said first winding for developing an induced voltage across said second winding in response to changing charging current in said first winding, a pair of output terminals, and means coupling said second winding and said capacitor in series circuit relationship across said output terminals to provide an output voltage of said predetermined polarity after a predetermined interval of time following the application of input voltage to said input terminals.

10. In a time delay circuit for energizing a device which responds to a voltage of predetermined polarity, a pair of output terminals connected to said device, a pair of input terminals connected to a source of unidirectional voltage having polarity corresponding to said predetermined polarity, a capacitor and a first inductor connected in series circuit relationship across said input terminals for charging said capacitor in response to the application of unidirectional voltage to said input terminals, a second inductor connected in series circuit relationship with said first inductor and magnetically coupled thereto to provide an induced voltage having polarity opposing said predetermined polarity in response to increasing charging current through said first inductor and to provide an induced voltage having polarity corresponding to said predetermined polarity in response to decreasing charging current through said first inductor, a damping resistor connected across said capacitor to dissipate electric energy thereby substantially preventing oscillation in the time delay circuit, and means coupling said second inductor and said capacitor to said output terminals to provide across said output terminals an output voltage comprising the induced voltage of said second inductor added to the voltage across said capacitor whereby an output voltage of said predetermined polarity is produced after a predetermined time interval following the instant of applying unidirectional voltage to said input terminals.

11. A time delay circuit for operating a device which responds to a voltage of predetermined polarity and magnitude comprising, a pair of output terminals connected to said device, a pair of input terminals supplied by unidirectional voltage having polarity corresponding to said predetermined polarity and having greater than said predetermined magnitude, a resistance and a first capacitor connected in series circuit relationship across said input terminals, a first inductor and a second capacitor connected in series circuit relationship across said first capacitor for charging said second capacitor whenever the unidirectional voltage is applied to said input terminals, a second inductor connected to said first inductor and magnetically coupled thereto to produce a voltage having polarity opposing said predetermined polarity in response to increasing charging current through said first inductor and to produce a voltage having polarity corresponding to said predetermined polarity in response to decreasing charging current through said first inductor, a damping resistor connected across said second capacitor to dissipate electric energy thereby substantially preventing oscillation in the time delay circuit, and means connecting said second inductor and said second capacitor in series circuit relationship to said output terminals to provide across said output terminals an output voltage which increases extremely rapidly with said predetermined polarity to said predetermined magnitude after a predetermined time delay following the application of unidirectional voltage to said input terminals.

12. In a relay for developing an output control signal in response to a predetermined phase relationship between two input electric quantities derived from an alternating current power system and having variable phase relationships with respect to each other, separate means for independently transforming the input quantities into alternating voltages having fixed phase relationships to their respective input quantities and variable overlapping relation with respect to each other, discriminating means responsive to said alternating voltages for producing a succession of substantially constant magnitude unipolarity resultant voltage impulses having periods of duration corresponding to the periods during which said alternating voltages have like polarities, and means responsive to a resultant impulse of greater than a predetermined duration for developing an output control signal, said predetermined duration indicating a predetermined phase relationship between the two input quantities.

13. A directional relay for an alternating current electric power system comprising, means for producing a succession of reference voltage impulses of duration and polarity representative of succeeding half cycles of a first alternating electric quantity derived from the system, separate means for producing a succession of operating voltage impulses of duration and polarity representative of succeeding half cycles of a second alternating electric quantity derived from the system and having a variable phase relationship to said first quantity, said reference and operating impulses thereby having variable overlapping relation with respect to each other, discriminating means responsive to said reference and operating impulses for developing substantially constant magnitude unipolarity resultant voltage impulses each having a duration dependent upon the time during which a reference impulse overlaps an operating impulse of like polarity, whereby the duration of a resultant impulse indicates the phase relationship between said first and second electric quantities, and means responsive to a resultant impulse of at least a predetermined duration for deriving an output control signal.

14. A directional relay for an alternating current electric power system comprising, means for producing a succession of substantially constant magnitude reference voltage blocks in response to succeeding half cycles of a first alternating electric quantity derived from the system, separate means for producing a succession of substantially constant magnitude operating voltage blocks in response to succeeding half cycles of a second alternating electric quantity derived from the system and having a variable phase relationship to said first quantity, said reference and operating blocks thereby having variable overlapping relation with respect to each other, discriminating means responsive to said reference and operating blocks for developing every half cycle a substantially constant magnitude unipolarity resultant voltage impulse having a duration corresponding to the portion of the half cycle during which a reference block overlaps an operating block of like polarity, whereby the duration of a resultant impulse indicates the phase relationship between said first and second electric quantities, and means responsive to an interval of less than a predetermined duration between successive resultant impulses for deriving a continuous output control signal.

15. In a fault detecting protective relaying arrangement for an alternating current electric power system having a multipole circuit interrupter, a pair of transforming means supplied by system current and voltage respectively for providing two alternating voltages having essentially fixed phase relationships with respect to the corresponding system quantities supplied, discriminating means responsive to said alternating voltages for producing a succession of substantially constant magnitude unipolarity resultant voltage impulses having periods of duration corresponding to the periods during which said alternating voltages have like polarities, means responsive to a resultant voltage impulse of greater than a predetermined duration for developing a first voltage signal, said predetermined duration indicating a predetermined phase relationship between the system current and voltage, coordinating means responsive to a predetermined magnitude of system current to produce after a predetermined time interval a second voltage signal, deenergizing means operable whenever any pole of the circuit interrupter is open to deenergize said coordinating means thereby preventing the production of said second voltage signal, and voltage responsive means supplied by said first and second voltage signals and operable only in response to the presence of both said signals to develop an output control voltage.

16. An overcurrent relay for an alternating current electric circuit comprising, means for deriving a unidirectional voltage having a value determined by the magnitude of alternating current, voltage responsive means having input terminals and operable to develop an output control signal whenever unidirectional voltage of at least a predetermined value is supplied to said input terminals, circuit means supplying said derived unidirectional voltage to said input terminals, said circuit means including rectifying means poled to prevent the transmission of electric energy away from said input terminals, a resistor and a capacitor connected in series circuit relationship across said input terminals, whereby unidirectional voltage applied to said input terminals will gradually charge said capacitor, and another rectifying means connected across said resistor to provide a shunt path around said resistor during discharge of said capacitor, whereby upon removal of said derived unidirectional voltage the voltage decay at said input terminals will be delayed.

17. An overcurrent relay for an alternating current electric circuit comprising, means for deriving a unidirectional voltage dependent upon the magnitude of alternating current, voltage responsive means supplied by said unidirectional voltage to produce a voltage signal of predetermined constant characteristics in response to unidirectional voltage of greater than a predetermined value, a capacitor connected to be charged by said voltage signal, inductive means having a first winding connected in the charging circuit of said capacitor and a second winding magnetically coupled to said first winding for developing an induced voltage across said second winding in response to changing charging current in said first winding, a pair of output terminals, and means coupling said second winding and said capacitor in series circuit relationship across said output terminals to provide after a predetermined interval of time following production of said voltage signal an output voltage of polarity corresponding to the polarity of said voltage signal.

18. In a relay for developing an output control signal in response to a predetermined phase relationship between two input electric quantities derived from an alternating current power system and having variable phase relationships with respect to each other, separate means for independently transforming the input quantities into alternating voltages having fixed phase relationships to their respective input quantities and a variable overlapping relation with respect to each other, discriminating means responsive to said alternating voltages for producing a succession of substantially constant magnitude unipolarity resultant voltage impulses having periods of duration corresponding to the periods during which said alternating voltages have like polarities, voltage dividing means supplied by said resultant voltage impulses, a first capacitor, a charging circuit connecting said first capacitor across said voltage dividing means and having a time constant selected to develop a first predetermined voltage level across said first capacitor in response to a resultant voltage impulse of greater than a predetermined duration, means including a first one-way electric valve coupling said first capacitor to a portion of said voltage dividing means to limit the voltage across said first capacitor to a predetermined maximum level and to provide a path for rapidly discharging said first capacitor during gaps between said resultant voltage impulses, a second capacitor, means including a second one-way electric valve coupling said second capacitor to said first capacitor to permit simultaneous charging of said first and second capacitors while preventing discharging of said second capacitor through the discharging path of said first capacitor, a discharging circuit for said second capacitor having a time constant selected to maintain greater than a second predetermined voltage level across said second capacitor for a predetermined time interval whenever said second capacitor is discharged from said predetermined maximum level during gaps between said resultant voltage impulses, and means connected to said second capacitor for initiating an output control signal in response to voltage of at least said first predetermined level and for maintaining the output control signal only in response to voltage greater than said second predetermined level.

19. A relaying arrangement for an alternating current circuit comprising, an overcurrent relay energized by a first electric quantity derived from the alternating current circuit and operable a predetermined time interval after said first electric quantity exceeds a predetermined magnitude to produce a supervising signal, and a directional relay energized by said first electric quantity and by a second derived electric quantity having a variable phase relationship with respect to said first quantity and operable in response to a predetermined range of phase relationships between said quantities, said directional relay including means connected to said overcurrent relay and rendered effective by said supervising signal to produce an output control signal when said directional relay is operating.

20. An overcurrent relay for an alternating current electric circuit comprising, rectifying means coupled to the circuit for deriving a unidirectional voltage having a value determined by the magnitude of alternating current, time delay means supplied by said unidirectional voltage to delay only the decay of said voltage, and voltage responsive means connected to said time delay means and operable to derive a continuous output control signal substantially instantaneously in response to unidirectional voltage of at least a predetermined value.

21. An overcurrent relay for an alternating current electric circuit comprising, rectifying means coupled to the circuit for deriving a unidirectional voltage dependent upon the magnitude of alternating current, voltage responsive means supplied by said unidirectional voltage to produce a voltage signal of predetermined constant characteristics substantially instantaneously in response to unidirectional voltage of greater than a predetermined value, and time delay means connected to said voltage responsive means for producing an output control signal after a predetermined fixed time interval not greater than approximately .006 seconds following energization by said voltage signal.

22. A relay for an alternating current electric power system comprising, means coupled to the power system for producing a succession of operating voltage impulses representative of an alternating current derived from the system, separate means coupled to the system for producing a succession of reference signal voltages impulses representative of an alternating voltage derived from the system, discriminating means responsive to said operating and reference voltage impulses for developing unipolarity resultant voltage impulses having periods of duration corresponding to the periods during which said operating and reference impulses have like polarities, whereby the duration of a resultant impulse indicates the phase relationship between the derived current and the derived voltage, and means responsive to a resultant impulse of at least a predetermined duration for deriving an output control signal.

23. A relay for an alternating current electric power system comprising, means coupled to the system for producing substantially square wave reference and operating voltages representative respectively of first and second alternating electric quantities derived from the system, discriminating means responsive to said reference and operating voltages for developing every half cycle a substantially constant magnitude unipolarity voltage impulse having a duration corresponding to the portion of the half cycle during which the reference and operating voltages have like polarities, whereby the duration of a unipolarity impulse indicates the phase relationship between said first and second electric quantities, means responsive to a unipolarity voltage impulse of at least a predetermined duration for deriving an output control signal, and means responsive to an interval of less than a predetermined duration between successive unipolarity voltage impulses for sustaining said output control signal.

24. A relay arrangement for an alternating current system comprising, means responsive to a predetermined phase relation between two electric quantities derived from the system and having variable phase relationship with respect to each other for deriving a first voltage signal, coordinating means responsive to a predetermined magnitude of one of said electric quantities to produce after a predetermined time interval a second voltage signal, and voltage responsive means supplied by said first and second voltage signals and operable only in response to the presence of both said voltage signals to develop an output control signal.

References Cited in the file of this patent

UNITED STATES PATENTS

| | | |
|---|---|---|
| 2,405,073 | Troell | July 30, 1946 |
| 2,432,328 | Morris | Dec. 9, 1947 |
| 2,468,418 | Thumin | Apr. 26, 1949 |
| 2,565,127 | Glassburn | Aug. 21, 1951 |
| 2,568,250 | O'Brien | Sept. 18, 1951 |
| 2,594,371 | Ward | Apr. 29, 1952 |
| 2,641,634 | Marihart | June 9, 1953 |
| 2,668,934 | Nierman | Feb. 9, 1954 |
| 2,673,956 | Beard | Mar. 30, 1954 |
| 2,687,511 | Penniman | Aug. 24, 1954 |
| 2,702,373 | Hickey | Feb. 15, 1955 |
| 2,703,389 | Schwartz | Mar. 1, 1955 |
| 2,708,254 | Macauley | May 10, 1955 |